US011212550B2

(12) United States Patent
Hung et al.

(10) Patent No.: US 11,212,550 B2
(45) Date of Patent: Dec. 28, 2021

(54) HISTORY-BASED MOTION VECTOR PREDICTION FOR AFFINE MODE

(71) Applicant: QUALCOMM Incorporated, San Diego, CA (US)

(72) Inventors: Chao-Hsiung Hung, San Diego, CA (US); Wei-Jung Chien, San Diego, CA (US); Marta Karczewicz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 5 days.

(21) Appl. No.: 16/576,330

(22) Filed: Sep. 19, 2019

(65) Prior Publication Data

US 2020/0099951 A1 Mar. 26, 2020

Related U.S. Application Data

(60) Provisional application No. 62/734,658, filed on Sep. 21, 2018.

(51) Int. Cl.
H04N 19/52 (2014.01)
H04N 19/55 (2014.01)
H04N 19/176 (2014.01)
H04N 19/61 (2014.01)
H04N 19/159 (2014.01)

(52) U.S. Cl.
CPC .......... H04N 19/52 (2014.11); H04N 19/159 (2014.11); H04N 19/176 (2014.11); H04N 19/55 (2014.11); H04N 19/61 (2014.11)

(58) Field of Classification Search
CPC ........ H04N 19/52; H04N 19/55; H04N 19/61; H04N 19/159; H04N 19/176
See application file for complete search history.

(56) References Cited

U.S. PATENT DOCUMENTS 10,362,330 B1 * 7/2019 Li .................. H04N 19/52
10,491,902 B1 * 11/2019 Xu ................. H04N 19/176
(Continued)

FOREIGN PATENT DOCUMENTS

WO WO-2020003274 A1 * 1/2020 ........... H04N 19/52

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

(Continued)

Primary Examiner — Dave Czekaj
Assistant Examiner — Shanikam M Brumfield
(74) Attorney, Agent, or Firm — Shumaker & Sieffert, P.A.

(57) ABSTRACT

A method of coding video data, including coding a first block of video data using affine motion compensation prediction, updating a history-based motion vector prediction table using one or more motion vectors from one or more blocks that spatially neighbor the first block, determining a motion vector for a second block of video data using the history-based motion vector prediction table, and coding the second block of video data using the determined motion vector.

30 Claims, 19 Drawing Sheets

(56) References Cited

U.S. PATENT DOCUMENTS

2020/0036997 A1* 1/2020 Li .................... H04N 19/52
2020/0374542 A1* 11/2020 Zhang ................ H04N 19/52

OTHER PUBLICATIONS

Bross B et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-V2, 43 pages.

Chen J., et al., "Algorithm description for Versatile Video Coding and Test Model 1 (VTM 1)", Joint Video Experts Yeam (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet URL: http://phenix.int-evry.fr/jvet/doc_end_user/documents/7_Torino/wg11/JVET-G0001-v1.zip, p. 20, Paragraph 2.3.7—p. 23, Paragraph 2 3.7.6, p. 17, Paragraph 2.3 5—p. 18, section 2.

Ergen S., "ZigBee/IEEE 802.15.4 Summary", Sep. 10, 2004, 37 Pages.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/052214—ISA/EPO—dated Jan. 8, 2020.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.

Yang H., et al., (Huawei): "Description of Core Experiment 4 (CE4): Inter Prediction and Motion Vector Coding", 11th JVET Meeting; Jul. 11, 2018-Jul. 18, 2018; Ljubljana; (The Joint Video Exploration Team of ISO/IEC JTC1/SC29/WG11 and ITU-T SG.16), No. JVET-K1024, Aug. 9, 2018, XP030193529, Retrieved from the Internet: URL http://phenix.int-evry.fr/jvet/doc_end_user/documents/11_Ljubljana/wg11/JVET-K1024-v2.zip JVET-K1024-v2.docx [retrieved on Aug. 9, 2018] Section 4.3.9, History-based Motion Vector Prediction (JVET-K0104), 45 pages.

Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

Zhao J., et al., (LGE): "CE4-related: History Based Affine Merge Candidate", 124th MPEG Meeting; Oct. 8, 2018-Oct. 12, 2018; Macao; (Motion Picture Expert Group or ISO/IEC JTC1/SC29/WG11), No. m44329, Sep. 25, 2018, XP030191032, Retrieved from the Internet: URL:http://phenix.int-evry.fr/mpeg/doc_end_user/documents/124_Macao/wg11/m44329-JVET-L0305-v1-JVET L0305.zip JVET_L0305.docx [retrieved on Sep. 25, 2018], Section 1 Proposed method, 4 pages.

* cited by examiner

HISTORY-BASED MOTION VECTOR PREDICTION FOR AFFINE MODE

This application claims the benefit of U.S. Provisional Application No. 62/734,658, filed Sep. 21, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction and motion vector prediction and reconstruction in video coding. More specifically, this disclosure describes techniques for inter prediction motion vector candidate list construction based on a history-based motion vector prediction (HMVP) table.

In examples of this disclosure, a video encoder and video decoder may be configured to update an HMVP table with normal, translational motion vectors after encoding and/or decoding a block of video data using inter prediction. In this context, a normal, translation motion vector is a motion vector that points to a predictive block in a different picture using an x,y displacement between the block being coded and the predictive block. The video encoder and video decoder may store a predefined number of motion vectors in the HMVP table. As new motion vectors are added to the HMVP table, older motion vectors may be removed (e.g., in a first-in, first-out fashion). In some circumstances, a video encoder and a video decoder may be configured to use motion vectors stored in an HMVP table to construct a motion vector predictor list and to determine motion vectors for an inter predicted block using the motion vector predictor list.

In addition to performing inter prediction using normal, translational motion vectors, some video coders may be configured to code video blocks using more complex motion models, such as an affine motion model. Affine motion models may be based on a motion field that is defined by two or more control point motion vectors. Because motion information for affine mode coded blocks is not directly analogous to normal inter prediction, the motion information for affine coded blocks is not added to an HMVP table. As such, in circumstances where a picture of video data includes many affine coded blocks in a region of the picture, the motion information stored in the HMVP table may become less and less accurate, as motion information from blocks closer to the currently coded block is generally more accurate than motion vectors from blocks further away than the currently coded block.

To address issues with HMVP table accuracy in video coding techniques that use both inter prediction and affine mode motion compensation, this disclosure describes techniques for updating an HMVP table when coding a block of video data using affine coding mode. In one example, a video encoder and video decoder may update a history-based motion vector prediction table using one or more motion vectors from one or more blocks that spatially neighbor the inter coded block. In this way, an HMVP table is updated even when coding blocks using affine mode.

In one example, a method includes coding a first block of video data using affine motion compensation prediction, updating a history-based motion vector prediction table using one or more motion vectors from one or more blocks that spatially neighbor the first block, determining a motion vector for a second block of video data using the history-based motion vector prediction table, and coding the second block of video data using the determined motion vector.

In another example, an apparatus includes a memory configured to store a first block of video data and a second block of video data, and one or more processors implemented in circuitry and in communication with the memory, the one or more processors configured to code the first block of video data using affine motion compensation prediction, update a history-based motion vector prediction table using one or more motion vectors from one or more blocks that spatially neighbor the first block, determine a motion vector for the second block of video data using the history-based motion vector prediction table, and code the second block of video data using the determined motion vector.

In another example, an apparatus includes means for coding a first block of video data using affine motion compensation prediction, means for updating a history-based motion vector prediction table using one or more motion vectors from one or more blocks that spatially neighbor the first block, means for determining a motion vector for a second block of video data using the history-based motion vector prediction table, and means for coding the second block of video data using the determined motion vector.

In another example, this disclosure describes a non-transitory computer-readable storage medium storing instructions that, when executed, cause one or more processors to code a first block of video data using affine motion compensation prediction, update a history-based motion vector prediction table using one or more motion vectors from one or more blocks that spatially neighbor the first block, determine a motion vector for a second block of video data using the history-based motion vector prediction table, and code the second block of video data using the determined motion vector.

The details of one or more examples are set forth in the accompanying drawings and the description below. Other features, objects, and advantages will be apparent from the description, drawings, and claims.

DETAILED DESCRIPTION

Figure 1:
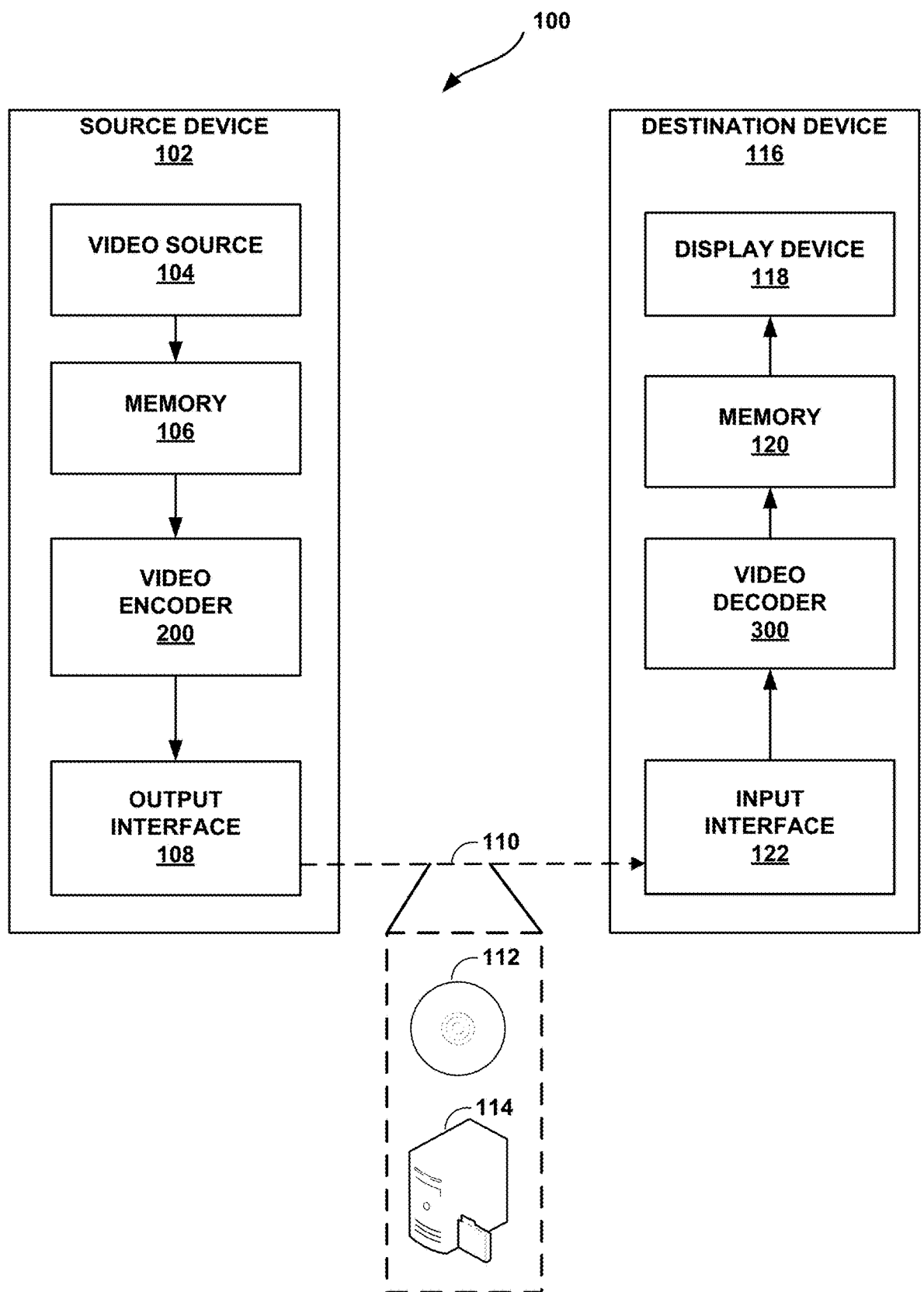
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (e.g., encoding and/or decoding) video data. In general, video data includes any data for processing a video. Thus, video data may include raw, uncoded video, encoded video, decoded (e.g., reconstructed) video, and video metadata, such as signaling data. As will be described in more detail below, this disclosure describes techniques for updating a history-based motion vector prediction (HMVP) table (e.g., HMVP candidate list) when coding (e.g., encoding and/or decoding) blocks of video data that are coded using affine motion compensation.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply techniques for history-based motion vector prediction for affine mode, as will be described in more detail below. Source device 102 represents an example of a video encoding device, while destination device 116 represents an example of a video decoding device. In other examples, source device 102 and destination device 116 may include other components or arrangements. For example, source device 102 may receive video data from an external video source, such as an external camera. Likewise, destination device 116 may interface with an external display device, rather than including an integrated display device.

System 100, as shown in FIG. 1, is merely one example. In general, any digital video encoding and/or decoding device may perform the techniques of this disclosure for history-based motion vector prediction for affine mode. Source device 102 and destination device 116 are merely examples of such coding devices in which source device 102 generates coded video data for transmission to destination device 116. This disclosure refers to a "coding" device as a device that performs coding (e.g., encoding and/or decoding) of data. That is, the term "coding" may generally refer to encoding or decoding. Likewise, the term "code" may generally refer to encode or decode. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

As will be explained in more detail below, this disclosure describes techniques for inter prediction motion vector candidate list construction based on a history-based motion vector prediction (HMVP) table. In some examples of this disclosure, video encoder 200 and video decoder 300 may be configured to update an HMVP table with normal, translational motion vectors after encoding and/or decoding a block of video data using inter prediction. In this context, a normal, translation motion vector is a motion vector that points to a predictive block in a different picture using an x,y displacement between the block being coded and the predictive block. Video encoder 200 and video decoder 300 may store a predefined number of motion vectors in the HMVP table. As new motion vectors are added to the HMVP table, older motion vectors may be removed (e.g., in a first-in, first-out fashion). In some circumstances, video encoder 200 and video decoder 300 may be configured to use motion vectors stored in an HMVP table to construct a motion vector predictor list and to determine motion vectors for an inter predicted block using the motion vector predictor list.

In addition to performing inter prediction using normal, translational motion vectors, video encoder 200 and video decoder 300 may be configured to code video blocks using more complex motion models, such as an affine motion model. Affine motion models may be based on a motion field that is defined by two or more control point motion vectors. Because motion information for affine mode coded blocks is not directly analogous to normal inter prediction, the motion information for affine coded blocks is not added to an HMVP table. As such, in circumstances where a picture of video data includes many affine coded blocks in a region of the picture, the motion information stored in the HMVP table may become less and less accurate, as motion information from blocks closer to the currently coded block are generally more accurate than motion vectors from blocks further away than the currently coded block.

To address issues with HMVP table accuracy in video coding techniques that use both inter prediction and affine mode motion compensation, this disclosure describes techniques for updating an HMVP table when coding a block of video data using affine coding mode. In one example, a video encoder 200 and video decoder 300 may update a history-based motion vector prediction table using one or more motion vectors from one or more blocks that spatially neighbor the inter coded block. In this way, an HMVP table is updated even when coding blocks using affine mode.

For example, video encoder 200 may be configured to encode a first block of video data using affine motion compensation prediction, update a history-based motion vector prediction table using one or more motion vectors from one or more blocks that spatially neighbor the first block, determine a motion vector for a second block of video data using the history-based motion vector prediction table, and encode the second block of video data using the determined motion vector.

Likewise, video decoder 300 may be configured to decode a first block of video data using affine motion compensation prediction, update a history-based motion vector prediction table using one or more motion vectors from one or more blocks that spatially neighbor the first block, determine a motion vector for a second block of video data using the history-based motion vector prediction table, and decode the second block of video data using the determined motion vector.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265 (G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December 2012), including its range extension, multiview extension (MV-HEVC) and scalable extension (SHVC), was developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now developing future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. An Algorithm description of Joint Exploration Test Model 7 (JEM-7) is described in J. Chen, E. Alshina, G. J. Sullivan, J.-R. Ohm, J. Boyce, "Algorithm Description of Joint Exploration Test Model 7", JVET-G1001, July 2017.

One draft for the new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. In other examples, video encoder 200 and video decoder 300 may operate according to other proprietary or industry standards, such as the Joint Exploration Test Model (JEM) and/or VVC. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. In other examples, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to examples of JEM and/or VVC. According to examples of JEM/VVC, a video coder (such as video encoder 200 and video decoder 300) partitions a picture into a plurality of coding tree units (CTUs). Video encoder 200 and video decoder 300 may partition a CTU according to a tree structure, such as a quadtree-binary tree (QTBT) structure. The QTBT structure of examples of JEM/VVC removes the concepts of multiple partition types, such as the separation between CUs, PUs, and TUs of HEVC. A QTBT structure of examples of JEM/VVC may include two levels: a first level partitioned according to quadtree partitioning, and a second level partitioned according to binary tree partitioning. A root node of the QTBT structure corresponds to a CTU. Leaf nodes of the binary trees correspond to coding units (CUs).

In a multi-type tree (MTT) partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left (above-left), or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure and/or MTT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
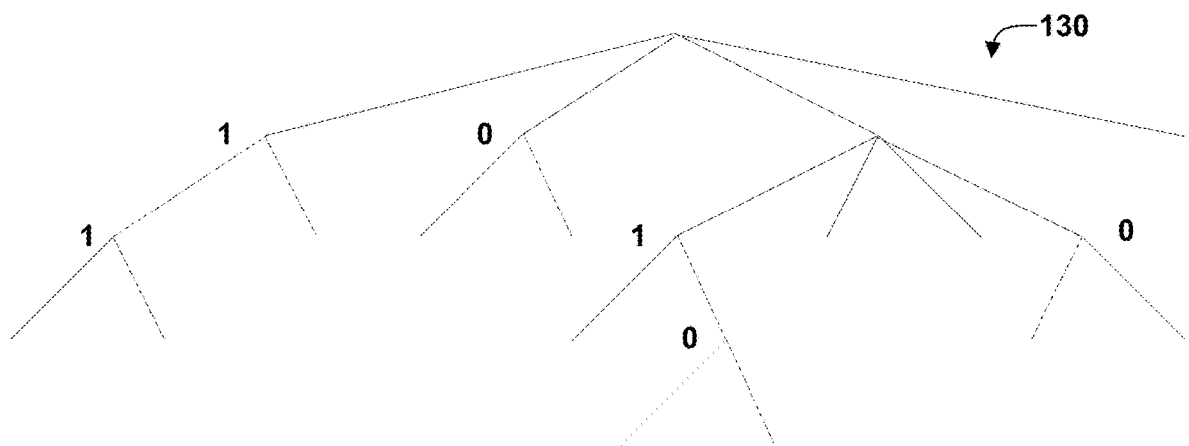
FIGS. 2A and 2B are conceptual diagrams illustrating an example quadtree binary tree (QTBT) structure, and a corresponding coding tree unit (CTU).
Figure 2B:
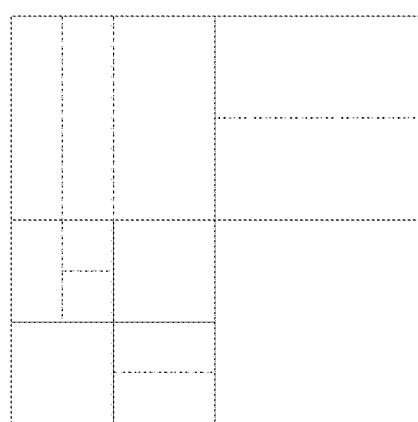

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
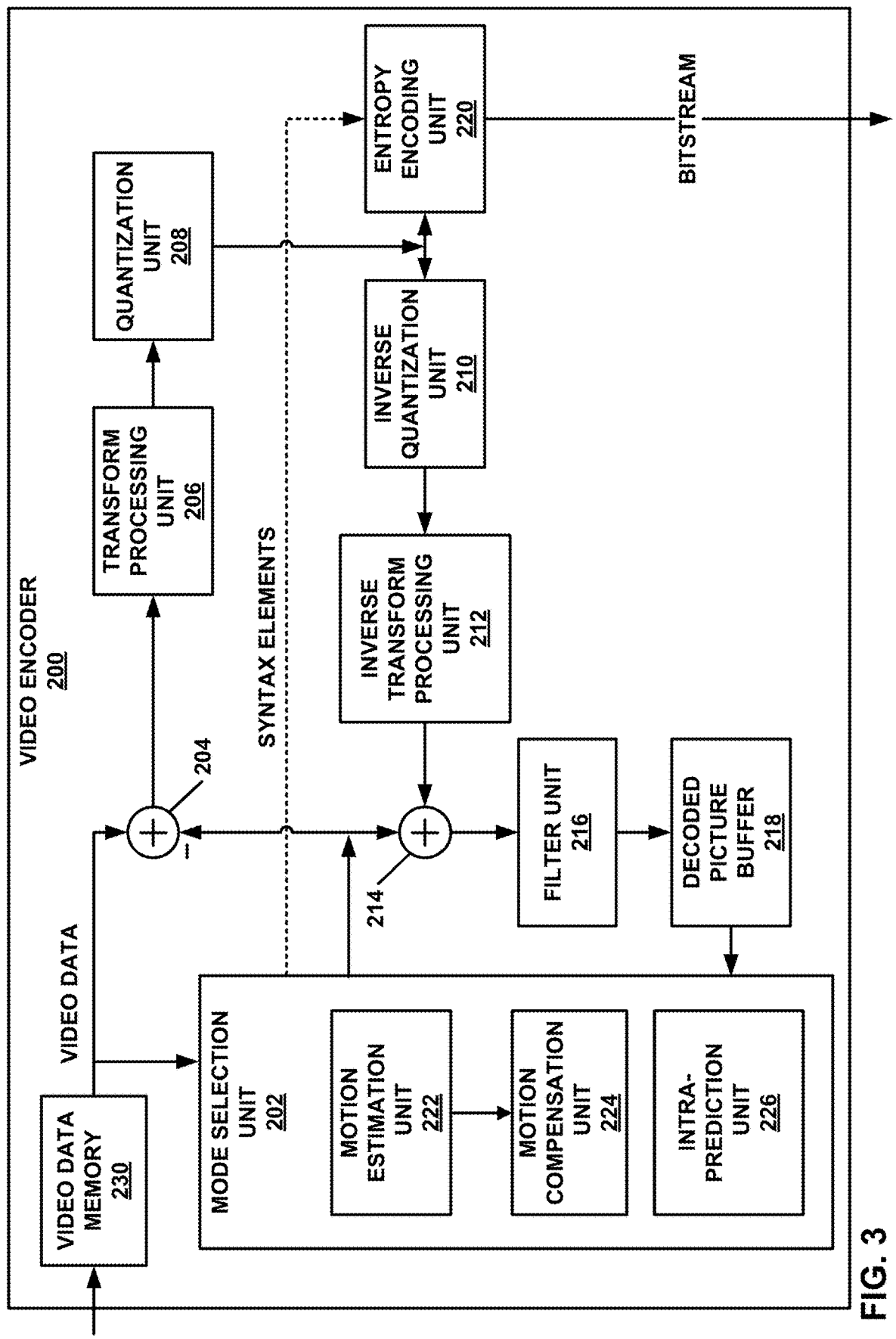
FIG. 3 is a block diagram illustrating an example video encoder that may perform the techniques of this disclosure.

FIG. 3 is a block diagram illustrating an example video encoder 200 that may perform the techniques of this disclosure for updating an HMVP table when coding a block using affine motion compensation. FIG. 3 is provided for purposes of explanation and should not be considered limiting of the techniques as broadly exemplified and described in this disclosure. For purposes of explanation, this disclosure describes video encoder 200 in the context of video coding standards, such as the HEVC video coding standard and the H.266/VVC video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine motion compensation unit (which may be part of motion estimation unit 222 and/or motion compensation unit 224), a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components of video encoder 200 (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, motion estimation unit 222 and motion compensation unit 224 may perform inter-prediction and motion vector prediction techniques when coding a block using an affine mode. For example, as will be explained in more detail below, motion estimation unit 222 and motion compensation unit 224 may be configured to encode a first block of video data using affine motion compensation prediction, update a history-based motion vector prediction table using one or more motion vectors from one or more blocks that spatially neighbor the first block, determine a motion vector for a second block of video data using the history-based motion vector prediction table, and encode the second block of video data using the determined motion vector.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 4:
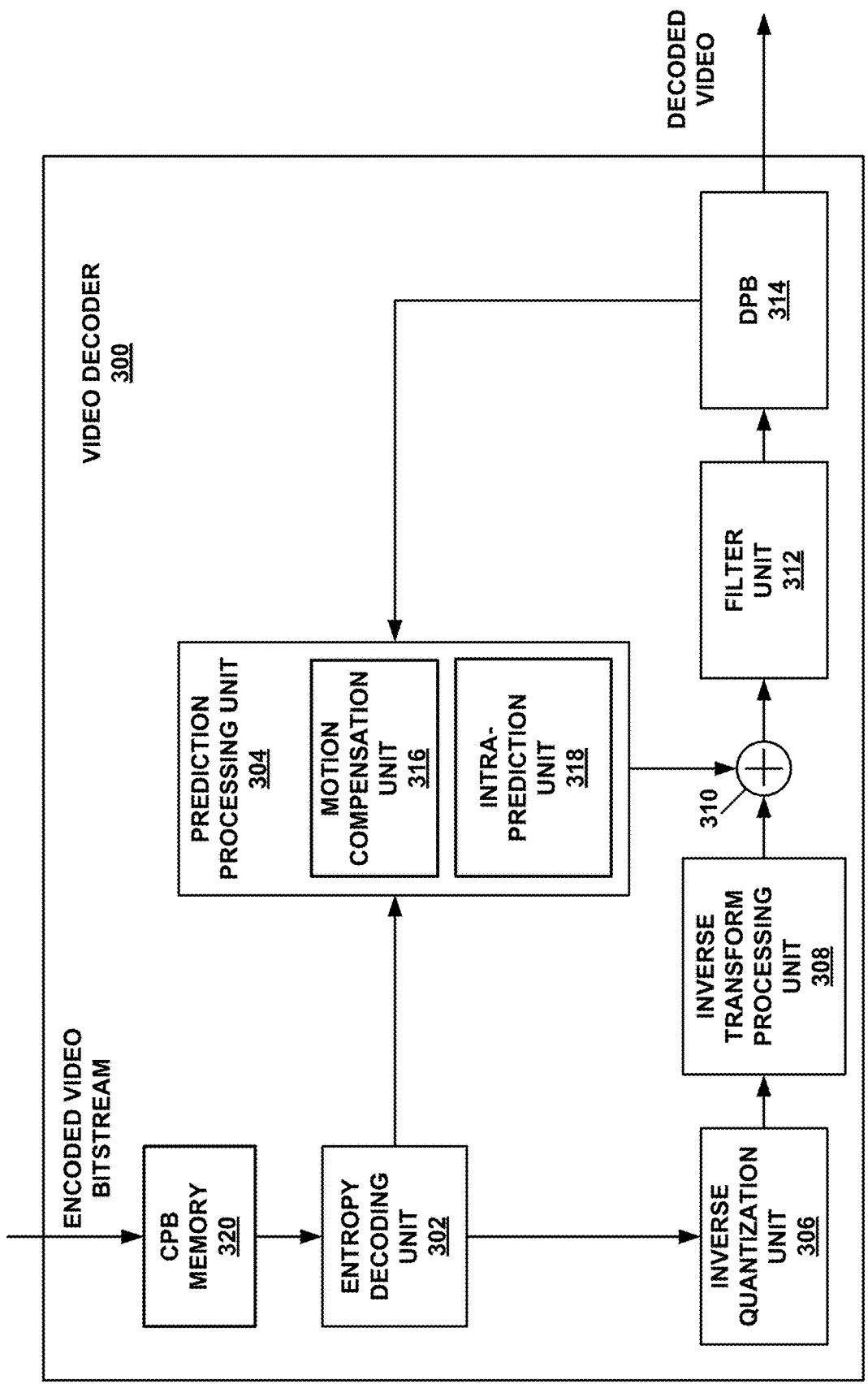
FIG. 4 is a block diagram illustrating an example video decoder that may perform the techniques of this disclosure.

FIG. 4 is a block diagram illustrating an example video decoder 300 that may perform the techniques of this disclosure for updating an HMVP table when decoding a block of video data using an affine mode. FIG. 4 is provided for purposes of explanation and is not limiting on the techniques as broadly exemplified and described in this disclosure. For purposes of explanation, this disclosure describes video decoder 300 is described according to the techniques of H.266/VVC, JEM, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In accordance with the techniques of this disclosure, motion compensation unit 316 may perform inter-prediction and motion vector prediction techniques when coding a block using an affine mode. For example, as will be explained in more detail below, motion compensation unit 316 may be configured to decode a first block of video data using affine motion compensation prediction, update a history-based motion vector prediction table using one or more motion vectors from one or more blocks that spatially neighbor the first block, determine a motion vector for a second block of video data using the history-based motion vector prediction table, and decode the second block of video data using the determined motion vector.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

The CU structure and motion vector prediction in HEVC will now be discussed. In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) can be the same size of a CTB, and as small as 8×8. Each coding unit is coded with one mode (e.g., inter prediction, intra prediction, etc.). When a CU is inter coded, video encoder 200 and video decoder 300 may further partition the CU into 2 or 4 prediction units (PUs) or just one PU when further partitioning does not apply. When two PUs are present in one CU, they can be half size rectangles or two rectangles that are ¼ or ¾ the size of the CU.

Motion Vector Prediction in HEVC

In the HEVC standard, there are two inter prediction modes, named merge (skip is considered as a special case of merge without residual) and advanced motion vector prediction (AMVP) modes, respectively, for a prediction unit (PU). In either AMVP or merge mode, video encoder 200 and video decoder 300 may construct and maintain a motion vector (MV) candidate list of multiple motion vector predictors. Video encoder 200 and video decoder 300 may generate the motion vector(s), as well as reference indices in the merge mode, of the current PU by taking the motion information of one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 are configured to use the reference pictures for the prediction of the current blocks. In addition, video encoder 200 and video decoder 300 are configured to determine the motion vector associated with the merge index. However, under AMVP mode, for each potential prediction direction from either list 0 or list 1, video encoder 200 explicitly signals a reference index, together with an MV predictor (MVP) index to the MV candidate list, since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Spatial Neighboring Candidates

Figure 5B:
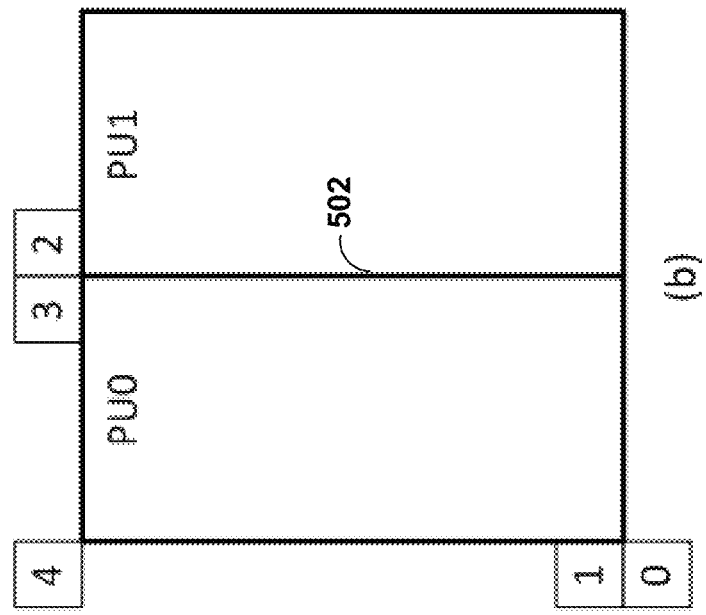
FIG. 5B is a conceptual diagram showing spatial neighboring candidates for advanced motion vector prediction (AMVP) mode.
Figure 5A:
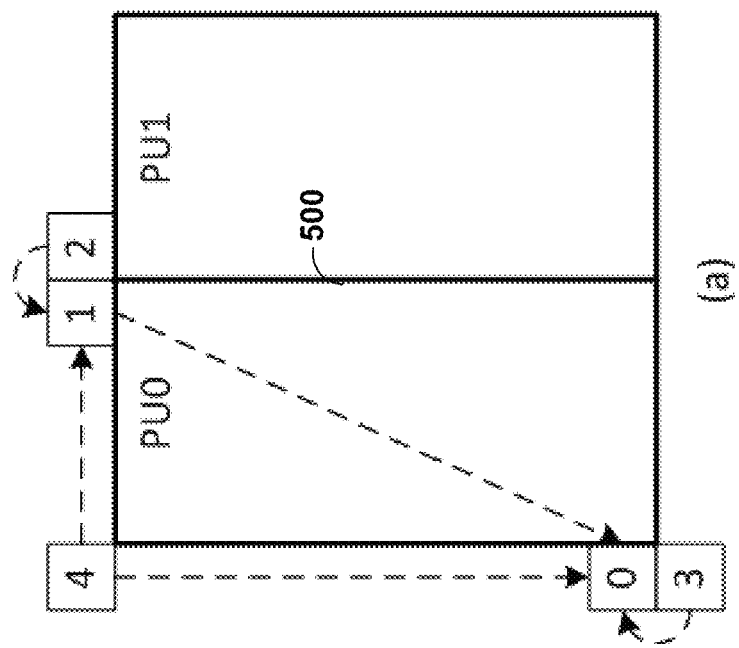
FIG. 5A is a conceptual diagram showing spatial neighboring candidates for merge mode.

In HEVC, video encoder 200 and video decoder 300 may derive spatial MV candidates from the neighboring blocks, as shown in FIG. 5A and FIG. 5B, for a specific PU ($PU_0$), although the techniques for generating the candidates from the blocks differ for merge and AMVP modes.

FIG. 5A is a conceptual diagram showing spatial neighboring candidates of block 500 for merge mode. FIG. 5B is a conceptual diagram showing spatial neighboring candidates of block 502 for AMVP mode. In merge mode, video encoder 200 and video decoder 300 may derive up to four spatial MV candidates in the order shown in FIG. 5A. The order is the following: a left block (0, A1), an above block (1, B1), an above-right block (2, B0), a below-left block (3, A0), and an above-left (4, B2) block.

In AVMP mode, video encoder 200 and video decoder 300 may divide the neighboring blocks into two groups: a left group including blocks 0 and 1, and an above group include blocks 2, 3, and 4, as shown in FIG. 5B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and video decoder 300 may scale the first available candidate to form the final candidate. Thus, the temporal distance differences can be compensated.

Temporal Motion Vector Prediction in HEVC

Video encoder 200 and video decoder 300 may be configured to add a temporal motion vector predictor (TMVP) candidate, if enabled and available, into the MV candidate list after spatial motion vector candidates. The process of motion vector derivation for a TMVP candidate is the same for both merge and AMVP modes. However, the target reference index for the TMVP candidate in the merge mode is set to 0.

Figures 6A, 6B:
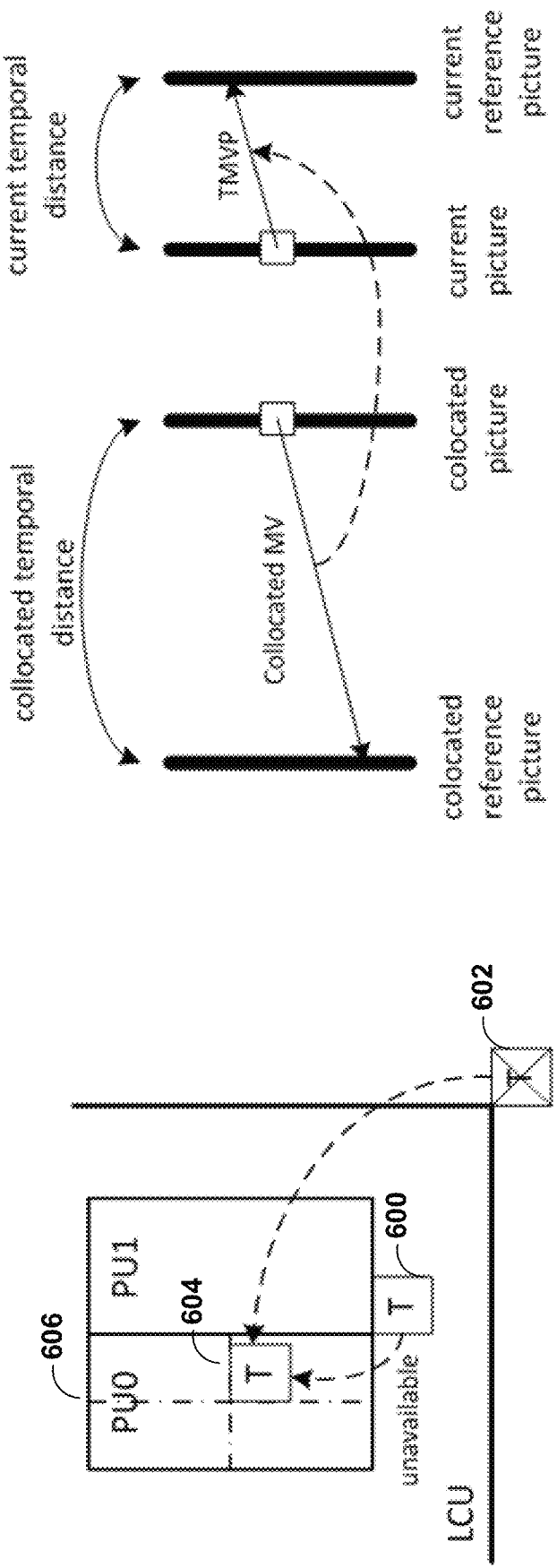
FIG. 6A is a conceptual diagram showing a temporal motion vector predictor candidate.
FIG. 6B is a conceptual diagram showing motion vector scaling.

The primary block location for TMVP candidate derivation is the bottom right block outside of the collocated PU. This bottom right blocks is shown in FIG. 6A as block 600 (T). Using this location for TMVP candidate derivation compensates the bias to the above and left blocks used to generate spatial neighboring candidates. However, if block 600 is located outside of the current CTB row (e.g., at block 602) or motion information is not available, video encoder 200 and video decoder 300 substitutes block 600 with a center block 604 of the PU 606 (PU0).

Video encoder 200 and video decoder 300 may derive a motion vector for the TMVP candidate from the co-located PU of the co-located picture, indicated in the slice level (e.g., in a slice header). The motion vector for the co-located PU is called the collocated MV.

Similar to temporal direct mode in H.264/AVC, to derive the TMVP candidate motion vector, video encoder 200 and video decoder 300 may scale the co-located MV to compensate the temporal distance differences, as shown in FIG. 6B.

Several additional aspects of merge and AMVP modes in HEVC are described below.

Motion Vector Scaling:

It is assumed that the value of motion vectors is proportional to the distance of pictures in the presentation time. A motion vector associates two pictures: the reference picture and the picture containing the motion vector (namely the containing picture). When a motion vector is utilized to predict the other motion vector, video encoder 200 and video decoder 300 may calculate the distance of the containing picture and the reference picture is based on the Picture Order Count (POC) values.

In some examples, for a motion vector to be predicted, both its associated containing picture and reference picture may be different. Therefore, video encoder 200 and video decoder 300 may calculate a new distance (based on POC) and video encoder 200 and video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector candidate list is not complete (e.g., includes less than a predetermined number of candidates), video encoder 200 and video decoder 300 may generate and insert artificial motion vector candidates at the end of the motion vector candidate list until the motion vector candidate list has the prescribed number of candidates.

In merge mode, there are two types of artificial MV candidates: a combined candidate derived only for B-slices and zero candidates, if the first type does not provide enough artificial candidates.

For each pair of candidates that are already in the candidate list and have the necessary motion information, motion vector candidate may derive bi-directional combined motion vector candidates by a combination of the motion vector of the first candidate referring to a picture in the list 0 and the motion vector of a second candidate referring to a picture in the list 1.

Pruning Process for Candidate Insertion:

Candidates from different blocks may happen to be the same, which decreases the efficiency of a merge/AMVP candidate list. Video encoder 200 and video decoder 300 may apply a pruning process to address this problem. The pruning process compares one candidate against the others in the current candidate list to avoid inserting identical candidates. To reduce the complexity, in some examples, video encoder 200 and video decoder 300 may only apply a limited number of pruning processes instead of comparing each potential candidate with all of the other existing candidates.

History-Based Motion Prediction

History-based motion vector prediction (HMVP) (e.g., as described in L. Zhang, K. Zhang, H. Liu, Y. Wang, P. Zhao, and D. Hong, "CE4-related: History-based Motion Vector Prediction", JVET-K0104, July 2018) involves keeping a table for previously-decoded motion vectors as HMVP candidates. In some examples, video encoder 200 and video decoder 300 may be configured to update the HMVP table when decoding a non-affine inter-coded block (e.g., a block coded suing a normal, translational motion vector). Video encoder 200 and video decoder 300 may add the retrieved motion vector as a new HMVP candidate to the last entry of a buffer or other memory storing the HMVP table. In some examples, video encoder 200 and video decoder 300 may apply a First-In-First-Out (FIFO) or constraint FIFO rule to add or remove candidates in the HMVP table. Video encoder 200 and video decoder 300 may be configured to use the candidates in the HMVP table for a merge candidate list or an AMVP candidate list. In one example, artificial motion vectors, including combined and zero candidates, can be replaced by the candidates in the HMVP table.

In some examples, video encoder 200 and video decoder 300 may be configured to empty the HMVP table when a processing a new slice. That is, in some examples, video encoder 200 and video decoder 300 may be configured to remove all entries in the HMVP table when coding a new slice. If a block is coded with merge/skip or AMVP mode, video encoder 200 and video decoder 300 may be configured to construct a merge candidate list or AMVP candidate list for the block. If the available candidate number in the list is less than the pre-defined maximum limit, video encoder 200 and video decoder 300 may be configured to use the candidates in HMVP table to fill out the candidate list. If there is a non-affine inter-coded block (e.g., a block coded using regular inter prediction), video encoder 200 and video decoder 300 may be configured to add the motion vector associated with that block to the last entry of the HMVP table. Video encoder 200 and video decoder 300 may be configured to update the HMVP table after adding new candidates.

Figure 7:
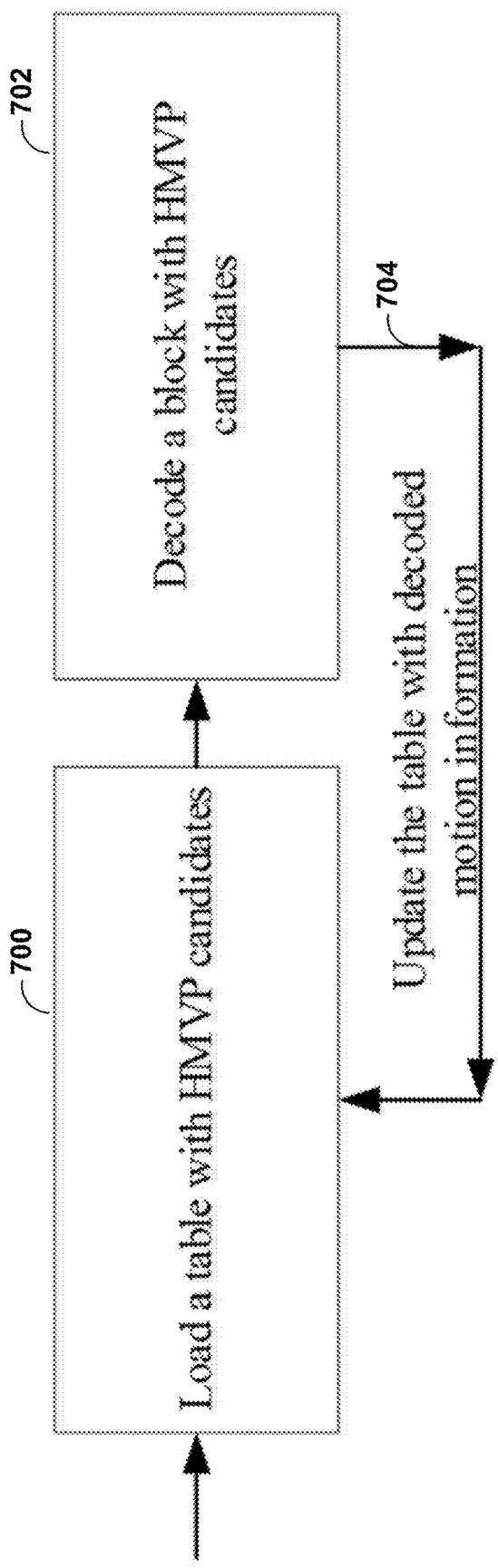
FIG. 7 is a flowchart showing an decoding flowchart using history-based motion vector predictor (HMVP).

The overall decoding flow when using HMVP is depicted in FIG. 7. As shown in FIG. 7, video decoder 300 may load a table with HMVP candidates (700). Video decoder 300 may then decode a block of video data using the HMVP candidates (702). For example, video decoder 300 may generate a merge or AMVP candidate list using candidates from the HMVP table. Video decoder 300 may determine motion information (e.g., a motion vector, reference picture index, and/or reference picture list) for the current block from the merge or AMVP candidate list and then may decode the block of video data using the determined motion information. Video decoder 300 may then update the HMVP table with the decoded motion information (704). For example, video decoder 300 may add the motion information for the decoded block of video data to the HMVP table. Video decoder 300 may then remove one or more candidates from the HMVP table using a predetermined rule, such as the FIFO rule or FIFO constraint rule described below.

Figure 8A:
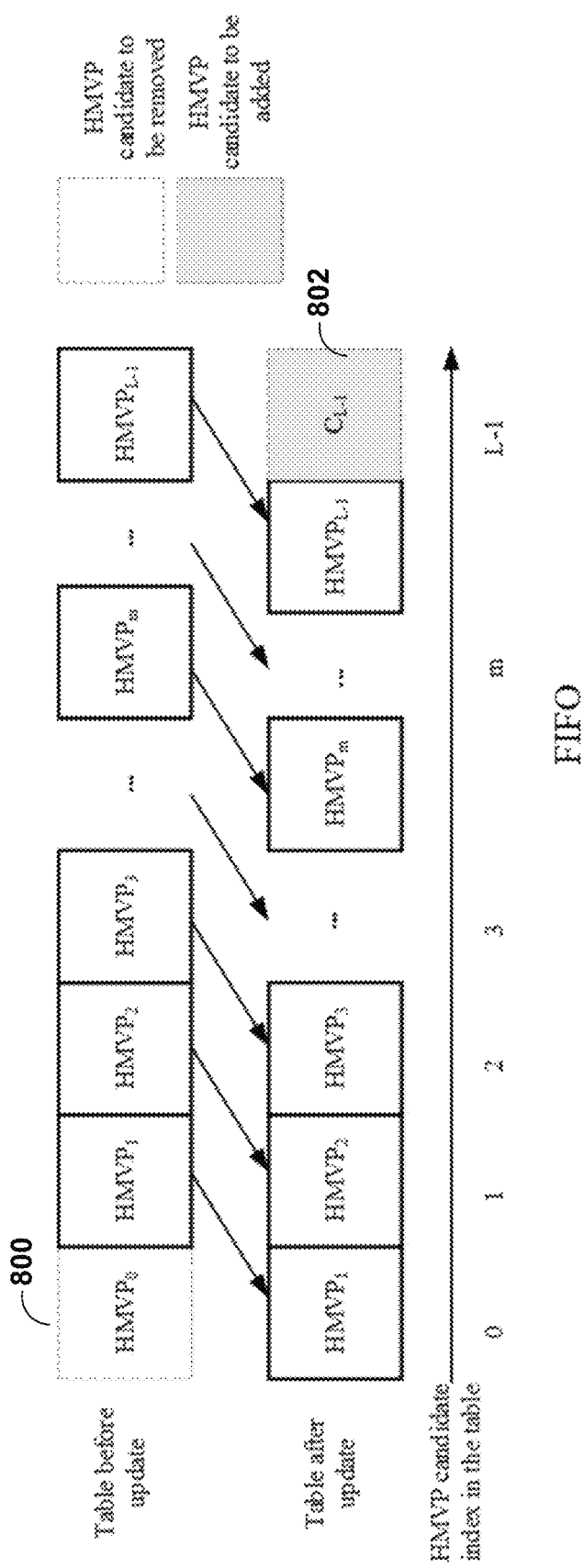
FIG. 8A is a conceptual diagram showing a table update process for a first-in, first-out (FIFO) buffer for HMVP.

Assuming the HMVP table size is L, in some examples, video encoder 200 and video decoder 300 may apply the First-In-First-Out (FIFO) rule shown in FIG. 8A when adding a new candidate to the table containing S HMVP candidates. As shown in FIG. 8A, the HMVP table, before updating, includes HMVP candidates $HMVP_0$ through $HMVP_{L-1}$. The HMVP candidate 800 ($HMVP_0$) to be removed is shown with white shading and a dashed outline. The HMPV candidate 802 ($C_{L-1}$) to be added is shown with gray shading and a dashed outline. During the update process, video encoder 200 and video decoder 300 adds the new candidate 802 ($C_{L-1}$) to the final entry of the HMVP table (arranged as a FIFO) and removes the candidate 800 ($HMVP_0$) in the first entry. As such, the HMVP table always contains the L newest candidates.

Figure 8B:
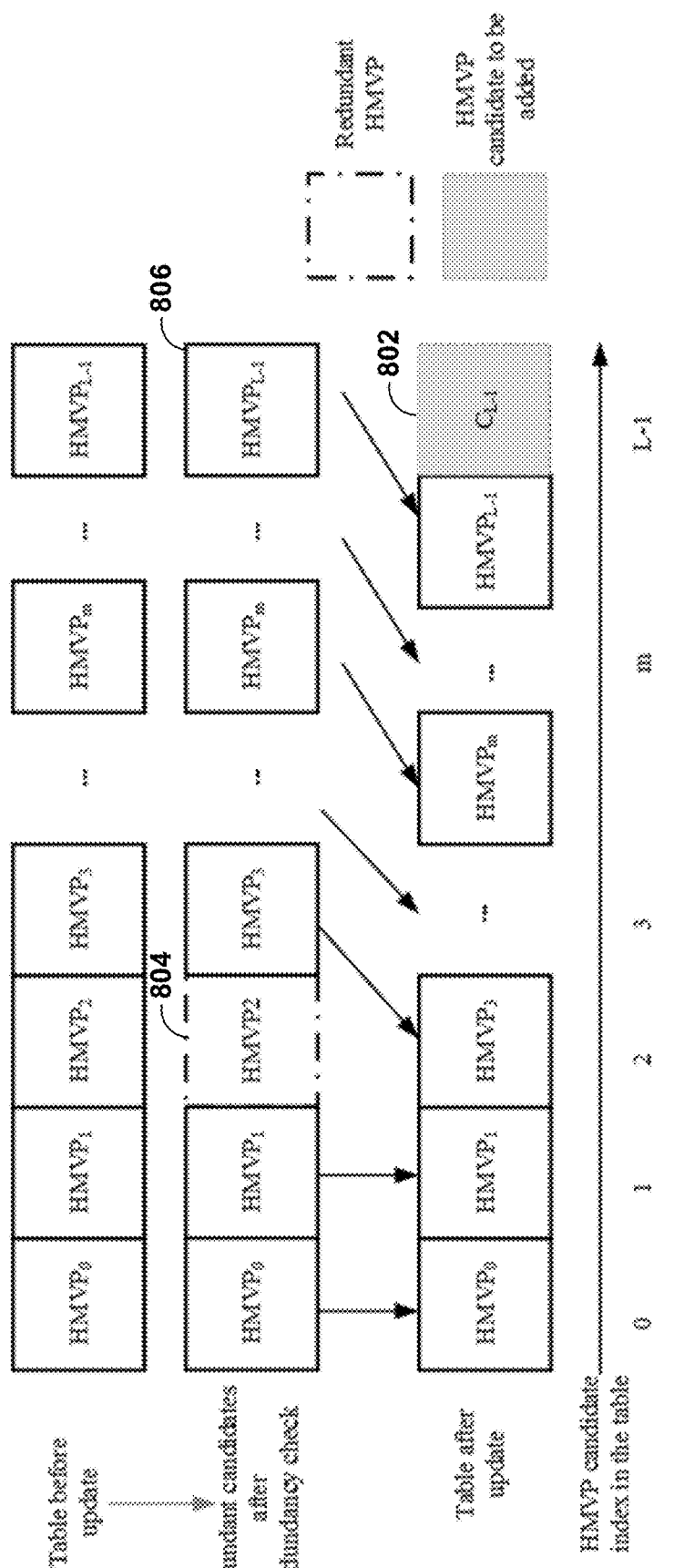
FIG. 8B is a conceptual diagram showing a table update process for a constraint FIFO buffer for HMVP.

The FIFO rule may cause the HMVP table to include redundant candidates (e.g., candidates with the same motion information). In other examples, video encoder 200 and video decoder 300 may use a constraint FIFO rule, as shown in FIG. 8B, to address the problem of redundant candidates. The constraint FIFO rule includes a pruning process. Before adding the new candidate 802 ($C_{L-1}$), video encoder 200 and video decoder 300 may remove redundant candidates in the table. In FIG. 8B, the redundant candidates are shaded in white with a dot-dash outline. In the example of FIG. 8B, candidate 804 ($HMVP_2$) is identical to a later added candidate (e.g., candidate 806 ($HMVP_{L-1}$). Video encoder 200 and video decoder 300 may move the candidates located after the removed candidate 804 forward to fill the empty entry. Then, video encoder 200 and video decoder 300 may add the new candidate 802 ($C_{L-1}$) to the last entry of the HMVP table.

As discussed above, video encoder 200 and video decoder 300 may use HMVP candidates in the merge candidate list construction process. Video encoder 200 and video decoder 300 may insert HMVP candidates from the last entry to the first entry in the HMVP table after the TMVP candidate. In one example, video encoder 200 and video decoder 300 may be configured to apply a pruning process to the HMVP candidates. In one example, video encoder 200 and video decoder 300 may continue to insert HMVP candidates to the merge candidate list until the merge candidate number reaches a predefined maximum limit.

Similarly, video encoder 200 and video decoder 300 may use HMVP candidates in the AMVP candidate list construction process. Video encoder 200 and video decoder 300 may insert the last K HMVP candidates to the AMVP candidate list after the TMVP candidate. In one example, the inserted HMVP candidate must have the same reference picture as that of AMVP. Video encoder 200 and video decoder 300 may also apply a pruning process on the HMVP candidates.

Affine Mode in JEM

Figure 9:
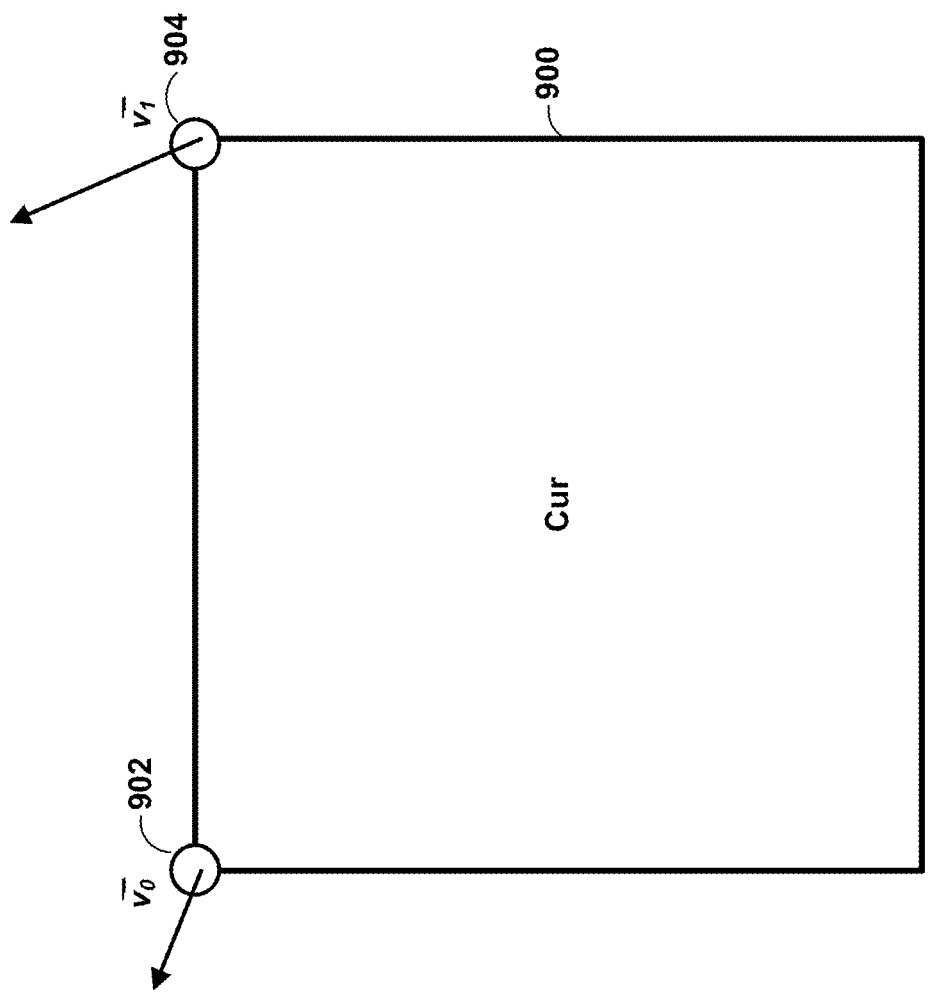
FIG. 9 is a conceptual diagram illustrating control points for a simplified affine motion model.

In HEVC, only a translation motion model is applied for motion compensation prediction (MCP). While in the real world, there are many kinds of motion, e.g., zoom in/out, rotation, perspective motions, and the other irregular motions. In the JEM, a simplified affine transform motion compensation prediction is applied. As shown in FIG. 9, the affine motion field of current block 900 (Cur) is described by two control point motion vectors: $v_0$ and $v_1$. Motion vector $v_0$ is associated with a top-left control point 902 and motion vector $v_1$ is associated with a top-right control point 904.

In general, the motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

where ($v_{0x}$, $v_{0y}$) is a motion vector of the top-left corner control point, and ($v_{1x}$, $v_{1y}$) is motion vector of the top-right corner control point.

In order to further simplify affine motion compensation prediction, video encoder 200 and video decoder 300 may be configured to apply sub-block based affine transform prediction. Video encoder 200 and video decoder 300 may be configured to derive the sub-block size M×N as in Equation 2, where MvPre is the motion vector fraction accuracy (1/16 in JEM), and ($v_{2x}$, $v_{2y}$) is a motion vector of the bottom-left control point calculated according to Equation 1.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad (2)$$

After M and N are derived by Equation 2, video encoder 200 and video decoder 300 may adjust the values of M and N downward, if necessary, to make M and N a divisor of w and h, respectively, where w is the width of the block and h is the height of the block from which the sub-blocks will be divided.

Figure 10:
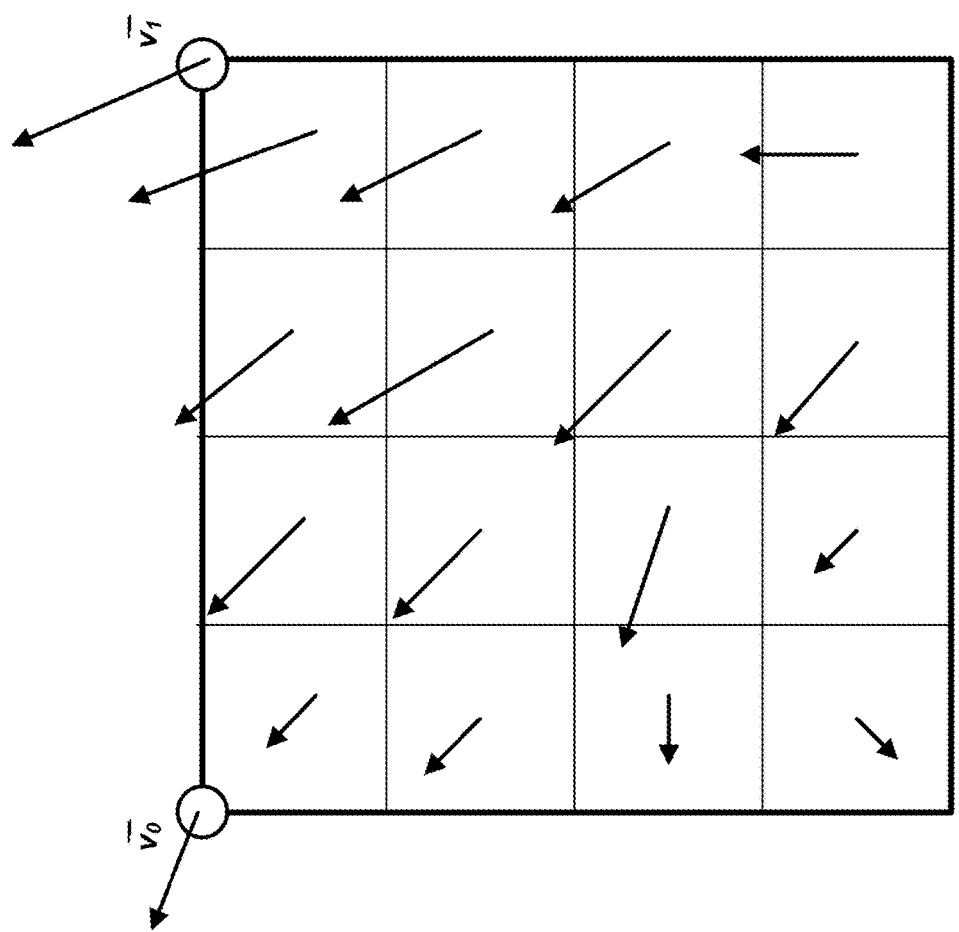
FIG. 10 is a conceptual diagram illustrating an affine motion vector field for sub-blocks.

To derive the motion vector of each M×N sub-block, video encoder 200 and video decoder 300 may calculate the motion vector of the center sample of each sub-block, as shown in FIG. 10, according to Equation 1, and rounded to 1/16 fraction accuracy.

After affine MCP, video encoder 200 and video decoder 300 may round and save the high accuracy motion vector of each sub-block at the same accuracy as the normal motion vector.

Figure 11:
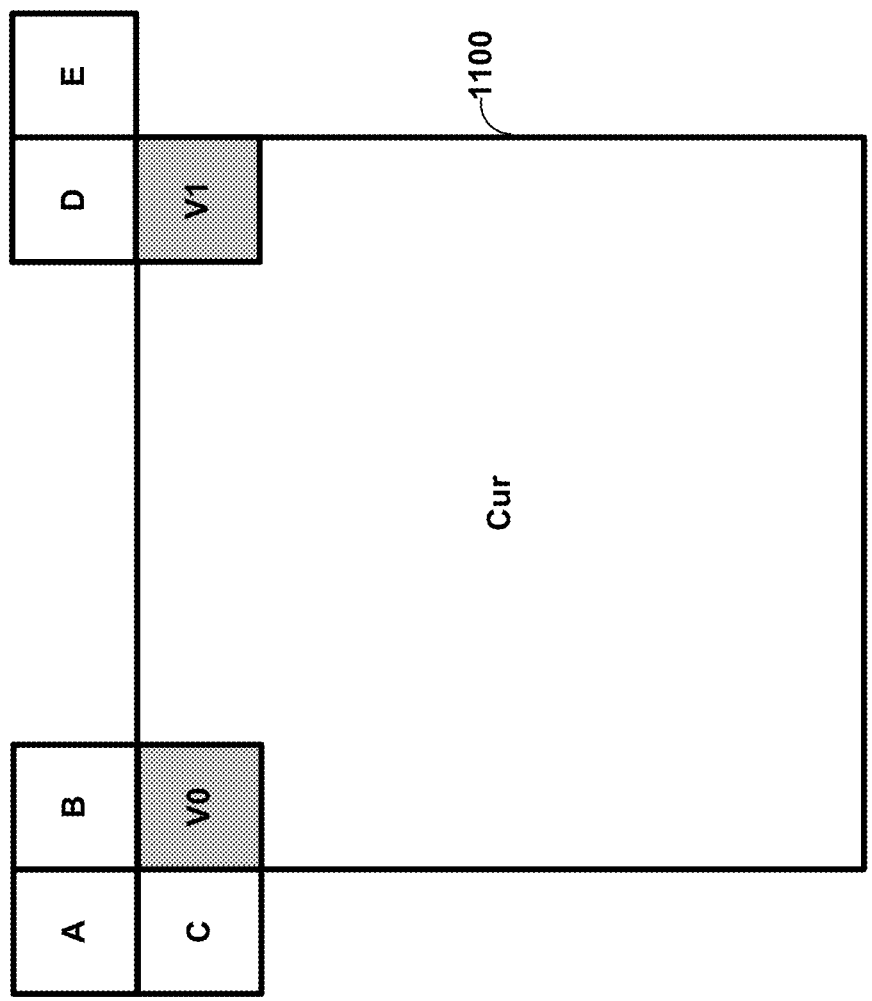
FIG. 11 is a conceptual diagram illustrating example motion vector predictors for affine mode.

In the JEM, there are two affine motion modes: affine inter prediction mode (AF_INTER mode) and affine merge mode (AF_MERGE mode). For CUs with both a width and a height larger than 8, video encoder 200 and video decoder 300 may be configured to use AF_INTER mode. Video encoder 200 may be configured to signal an affine flag in the CU level in the bitstream to indicate whether AF_INTER mode is used. In AF_INTER mode, video encoder 200 and video decoder 300 may construct a candidate list with motion vector pairs $\{(v_0, v_1)|v_0=\{v_A, v_B, v_C\}, v_1=\{v_D,v_E\}\}$ using the neighbour blocks. As shown in FIG. 11, video encoder 200 and video decoder 300 may select $v_0$ from the motion vectors of the neighboring blocks A, B or C of current (Cur) block 1100. Video encoder 200 and video decoder 300 may scale the motion vector from the neighbour block according to the reference list and the relationship among the POC value of the reference for the neighbor block, the POC value of the reference for the current CU, and the POC value of the current CU. The approach to select $v_1$ from the neighbour blocks D and E is similar.

If the number of candidates in the candidate list is smaller than two (2), video encoder 200 and video decoder 300 may pad the list with a motion vector pair created by duplicating each of the AMVP candidates. When the candidate list is larger than two (2), video encoder 200 and video decoder 300 may first sort the candidates sorted according to the consistency of the neighbouring motion vectors (similarity of the two motion vectors in a pair candidate) and may keep only the first two candidates. Video encoder 200 may use a rate-distortion (RD) cost check to determine which motion vector pair candidate is selected as the control point motion vector predictor (CPMVP) of the current CU. Video encoder 200 may signal an index indicating the position of the CPMVP in the candidate list in the bitstream. After the CPMVP of the current affine CU is determined, video encoder 200 may apply affine motion estimation and the control point motion vector (CPMV) is found. Then, video encoder 200 may signal the difference of the CPMV and the CPMVP in the bitstream.

Figure 12:
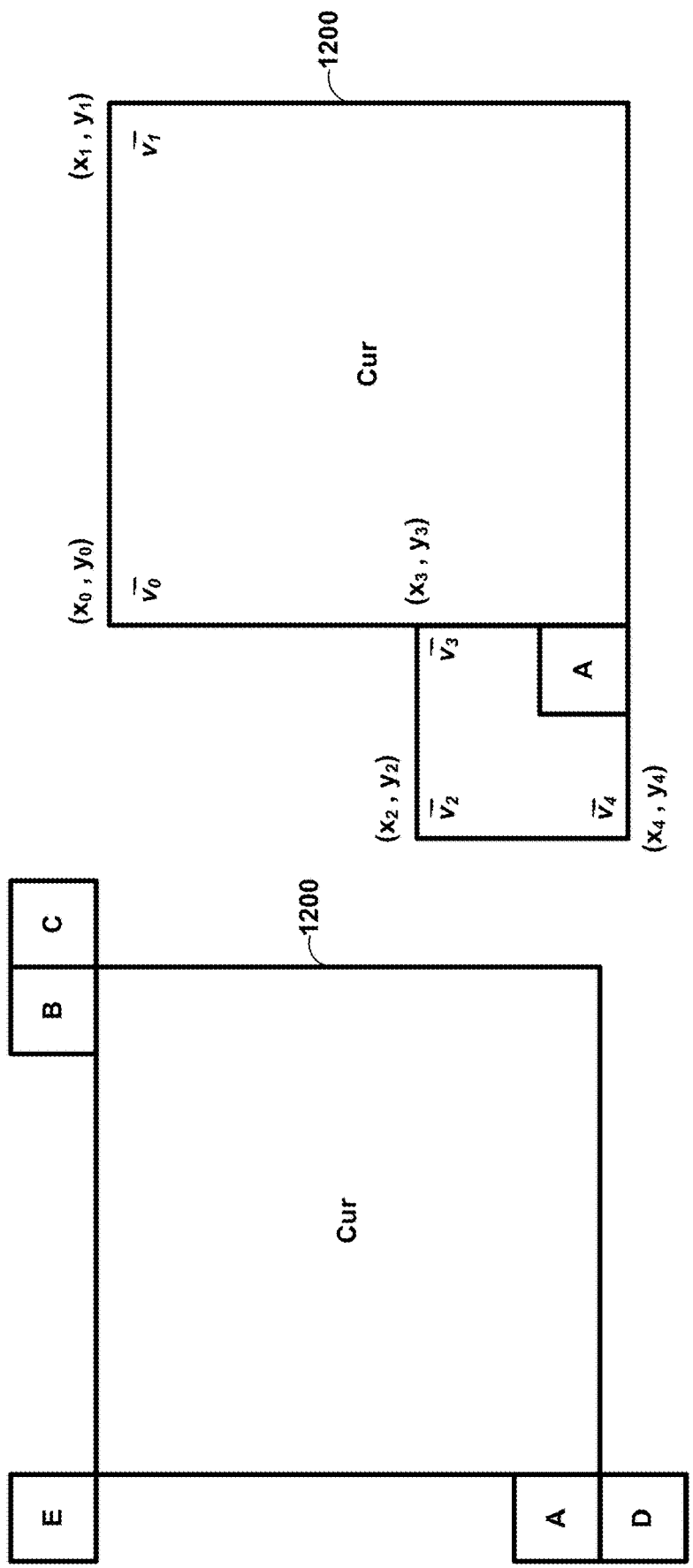
FIG. 12 is a conceptual diagram illustrating candidates for an affine merge mode.

When a CU is coded in AF_MERGE mode, video encoder 200 and video decoder 300 may be configured to obtain the first block coded with affine mode from neighbour reconstructed blocks. As shown in FIG. 12, the selection order for the candidate block relative to current (Cur) block 1200 is from left (A), above (B), above-right (C), left-bottom (D), to above-left (E). If the neighbour left bottom block A is coded in affine mode, as shown in FIG. 12, video encoder 200 and video decoder 300 may derive the motion vectors $v_2$, $v_3$ and $v_4$ of the top left corner, above right corner and left bottom corner of the CU which contains the block A. Video encoder 200 and video decoder 300 may calculate the motion vector $v_0$ of the top left corner on the current CU 1200 according to $v_2$, $v_3$ and $v_4$. Next, video encoder 200 and video decoder 300 may calculate the motion vector $v_1$ of the above right of the current CU 1200.

After video encoder 200 and video decoder 300 derive the CPMV of the current CU $v_0$ and $v_1$, video encoder 200 and video decoder 300 may generate the MV field of the current CU according to the simplified affine motion model in Equation 1. In order to identify whether the current CU is coded with AF_MERGE mode, video encoder 200 may signal an affine flag in the bitstream when there is at least one neighbour block that is coded in affine mode.

In some examples of JEM and VVC, when coding video data using an HMVP table, video coders are not configured to update the HMVP table when encountering an affine mode block (i.e., a block coded using affine mode). If the frame contains many affine mode blocks, the HMVP process will keep the HMVP candidates unchanged while processing these affine mode blocks. Thus, these unchanged HVMP candidates have less coding improvement for future inter-coded blocks. The new video sequences usually have high resolution and complex motion types. These complex motions make the number of affine mode blocks typically larger. The increasing number of affine mode blocks may deteriorate HMVP coding performance.

To address the problems mentioned above, the following techniques are proposed. Any combination of the techniques below may be applied together in any combination.

Figure 13:
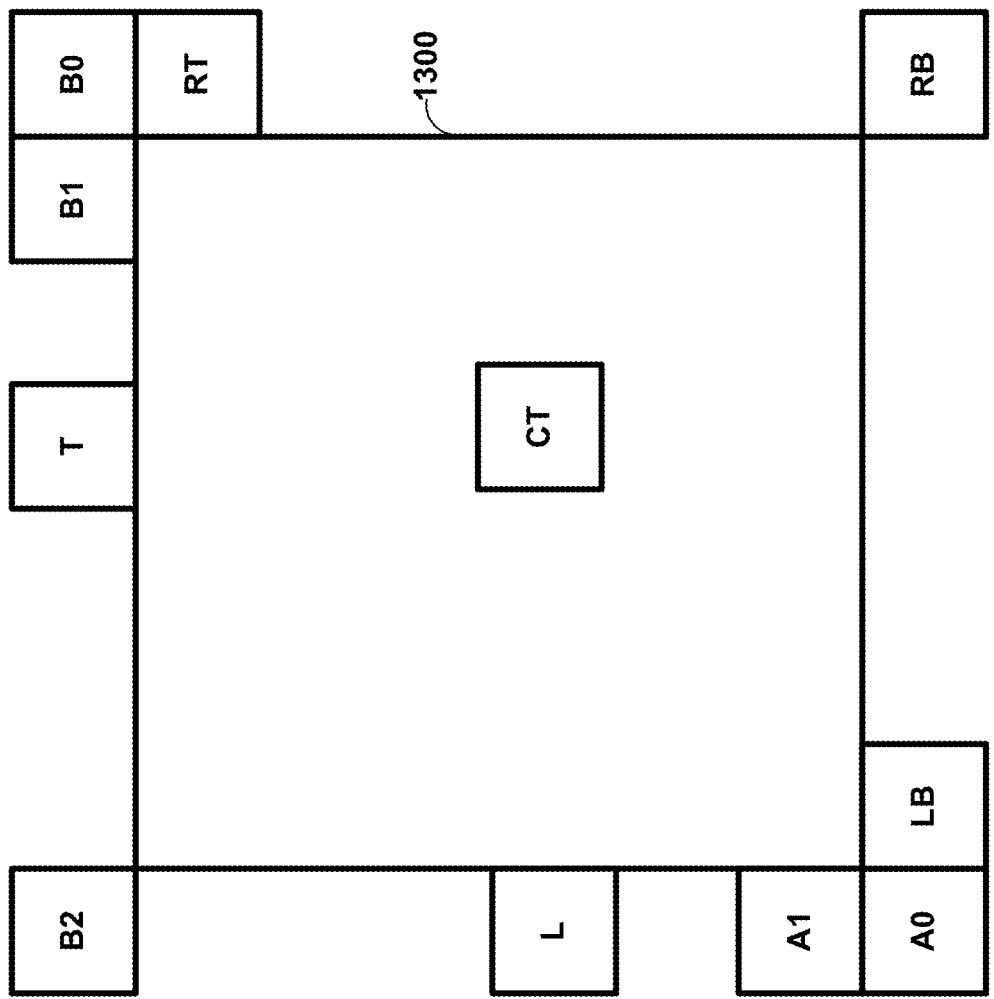
FIG. 13 is a conceptual diagram illustrating spatial neighboring blocks for an affine HMVP mode.

In one example of the disclosure, for an affine mode coded block, video encoder 200 and video decoder 300 may be configured to use one or more motion vectors of one or more spatially neighboring blocks, relative to the currently affine mode coded block, to update an HMVP table. For example, as shown in FIG. 13, the MV of 5 spatial neighboring blocks (A0, A1, B0, B1, and B2) of current block 1300, if available, can be used for updating HMVP candidates in the HMVP table. In this context, a block is "available" if the block has an associated motion vector (e.g., the neighboring block was inter predicted). In this way, older candidates in the HMVP table are replaced, even when coding blocks using affine mode. As such, inter prediction accuracy when using motion vector prediction candidates from an HMVP table may be improved.

Video encoder 200 and video decoder 300 may be configured to add motion vectors to the HMVP table in the same manner. Accordingly, in one example of the disclosure, video encoder 200 and video decoder 300 may be configured to encode/decode (e.g., code) a first block (e.g., block 1300 of FIG. 13) of video data using affine motion compensation prediction. Video encoder 200 and video decoder 300 may be further configured to update a history-based motion vector prediction table using one or more motion vectors from one or more blocks that spatially neighbor the first block. In one example, of the disclosure, video encoder 200 and video decoder 300 may be configured to update the history-based motion vector prediction table with one or more of a motion vector of a below-left spatially neighboring block (A0) of the first block, a motion vector of a left spatially neighboring block (A1) of the first block, a motion vector of an above-right spatially neighboring block (B0) of the first block, a motion vector of an above spatially neighboring block (B1) of the first block, or a motion vector of an above-left spatially neighboring block (B2) of the first block.

In one example, video encoder 200 and video decoder 300 may add the first motion vector that is available from blocks A0, A1, B0, B1, and B2 of FIG. 13 to the HMVP table. Video encoder 200 and video decoder 300 may be configured to check the one or more blocks that spatially neighbor the first block in the following order: the below-left spatially neighboring block (A0), the left spatially neighboring block (A1), the above-right spatially neighboring block (B0), the above spatially neighboring block (B1), and the above-left spatially neighboring block (B2). In other examples, video encoder 200 and video decoder 300 may be configured to add all motion vectors to the HMVP table that are available from spatially neighboring blocks A0, A1, B0, B1, and B2.

After updating the HMVP table, video encoder 200 and video decoder 300 may be configured to encode/decode a second block of video data using normal inter prediction. Video encoder 200 and video decoder 300 may be configured to determine a motion vector for the second block of video data using the history-based motion vector prediction table. For example, as described above, video encoder 200 and video decoder 300 may determine a motion vector for the second block of video data using a merge mode or an AMVP mode of motion vector prediction. To perform the motion vector prediction, video encoder 200 and video decoder 300 may construct a motion vector candidate list. In some examples, video encoder 200 and video decoder 300 may construct the motion vector candidate list using at least one motion vector from the history-based motion vector prediction table, as described above. Video encoder 200 and video decoder 300 may then determine the motion vector for the second block of video data using the motion vector candidate list, and encode/decode the second block of video data using the determined motion vector.

The use of blocks A0, A1, B0, B1, and B2 is just one example set of spatially neighboring blocks of an affine coded block that may be used to add a motion vector to an HMVP table. Different numbers and locations of blocks may be used, including non-adjacent blocks.

In one example, for an affine mode block, the MV of center-left (L) neighboring block and neighboring center-top (T) in FIG. 13, if available, can be used for updating HVMP candidates. That is, video encoder 200 and video decoder 300 may be configured to update the history-based motion vector prediction table with one or more of a motion vector of a center-left spatially neighboring block of the first block and a motion vector of a center-top spatially neighboring block of the first block.

In another example, for an affine mode block, the MVs of neighboring blocks between B1 and B2 in FIG. 13, if available, can be used for updating HVMP candidates. That is, the one or more processors of video encoder 200 and video decoder 300 may be configured to update the history-based motion vector prediction table, and further configured to update the history-based motion vector prediction table with one or more motion vectors of spatially neighboring blocks of the first block that are between an above-right spatially neighboring block and an above-left spatially neighboring block.

In another example, for an affine mode block, the MVs of neighboring blocks between A1 and B2 in FIG. 13, if available, can be used for updating HVMP candidates. That is, video encoder 200 and video decoder 300 may be configured to update the history-based motion vector prediction table with one or more motion vectors of spatially neighboring blocks of the first block that are between a below-left spatially neighboring block and an above-left spatially neighboring block.

Figure 14:
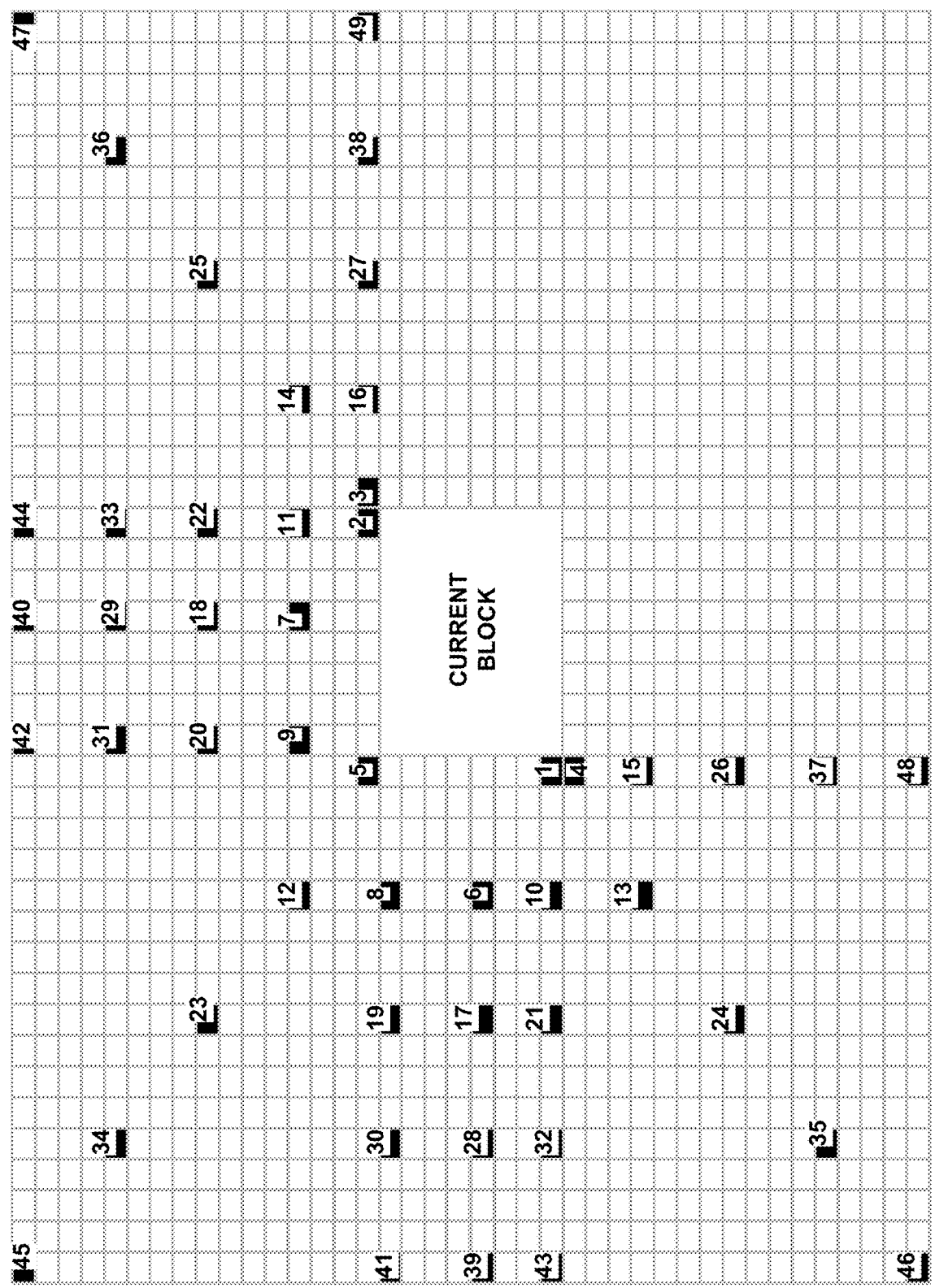
FIG. 14 is a conceptual diagram illustrating non-adjacent spatial neighboring blocks for an affine HMVP mode.

FIG. 14 illustrates examples of non-adjacent spatial neighboring blocks (e.g., blocks that are not immediately neighboring the current block). In FIG. 14, blocks identified as 1-5 may be adjacent blocks to the current block (e.g., immediately neighboring), and blocks identified as 6-49 may be non-adjacent to the current block (e.g., not immediately neighboring but proximate). In some examples, the numbers associated with the blocks shown in FIG. 14 may represent the order in which adjacent and non-adjacent motion vector prediction candidates are added into the HMVP table.

In another example of the disclosure, for an affine mode block, the MVs of non-adjacent neighboring blocks in FIG. 14, if available, can also be used for updating HVMP candidates. That is, video encoder 200 and video decoder 300 may be configured to update the history-based motion vector prediction table with one or more non-adjacent spatially neighboring blocks of the first block.

The techniques of this disclosure allow for more HMVP table updating. Adding spatial neighboring available motion vectors of current affine mode blocks to the HMVP table keeps the table updated. Thus, the table still keeps newer motion vectors with a higher probability for future prediction or merge operation.

The techniques of this disclosure may also reduce coding efficiency deterioration cause by affine mode blocks. Affine model blocks are suitable for complex motion vectors. New video sequences contain not only high resolution, but also complex motion vectors. Thus, the affine mode will be selected with higher probability when processing these video sequences. Updating the HMVP table when coding blocks under an affine model may improve coding efficiency of non-affine blocks.

Figure 15:
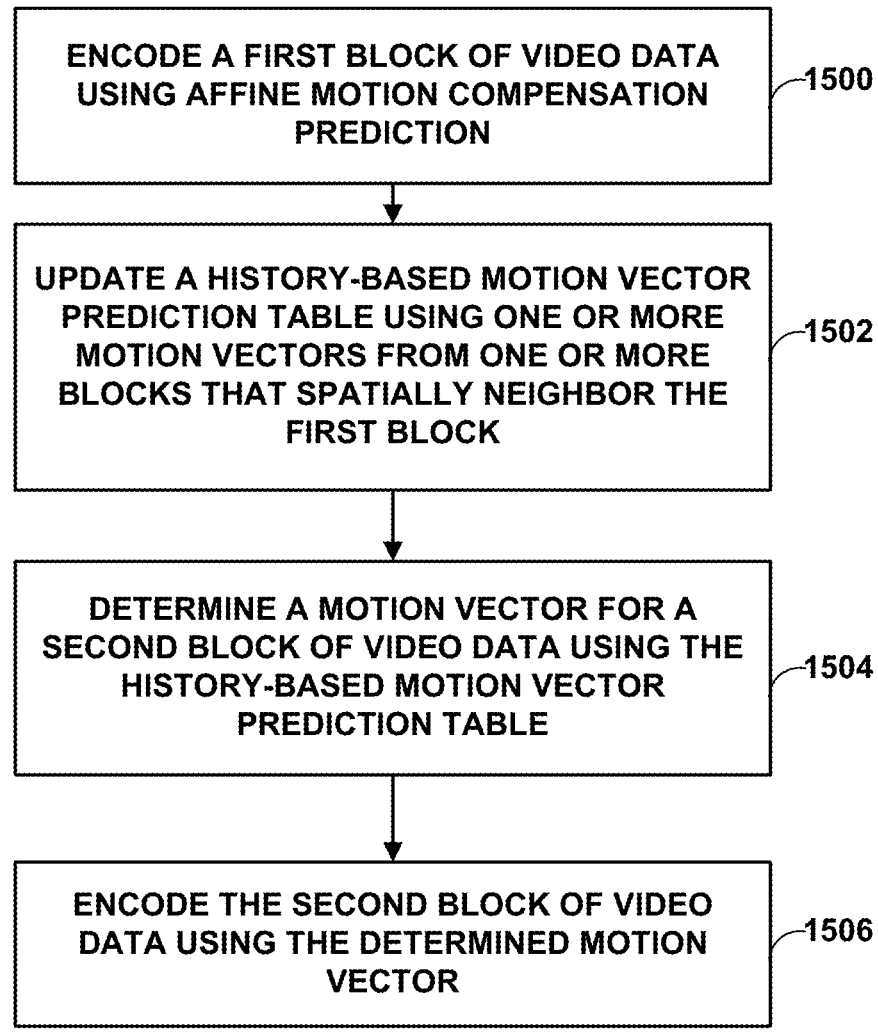
FIG. 15 is a flowchart illustrating an example encoding method.

FIG. 15 is a flowchart illustrating an example encoding method. The techniques of FIG. 15 may be performed by one or more structural units of video encoder 200 (see FIG. 3), including motion estimation unit 222 and/or motion compensation unit 224.

In one example of the disclosure, video encoder 200 may be configured to encode a first block of video data using affine motion compensation prediction (1500), and update a history-based motion vector prediction table using one or more motion vectors from one or more blocks that spatially neighbor the first block (1502). Video encoder 200 may be further configured to determine a motion vector for a second block of video data using the history-based motion vector prediction table (1504), and encode the second block of video data using the determined motion vector (1506).

In some examples, video encoder 200 may include a camera configured to capture a picture containing the first block of video data and the second block of video data.

Figure 16:
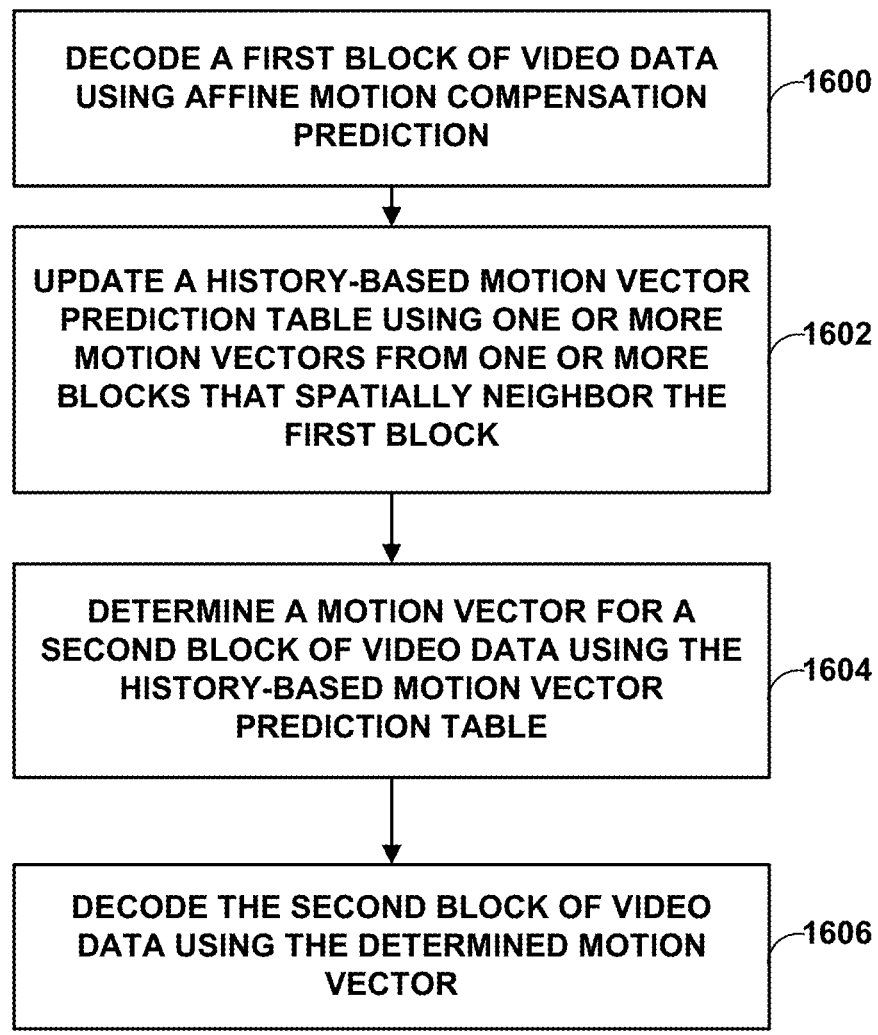
FIG. 16 is a flowchart illustrating an example decoding method.

FIG. 16 is a flowchart illustrating an example decoding method. The techniques of FIG. 16 may be performed by one or more structural units of video decoder 300 (see FIG. 4), including motion compensation unit 316.

In one example of the disclosure, video decoder 300 may be configured to decode a first block of video data using affine motion compensation prediction (1600), and update a history-based motion vector prediction table using one or more motion vectors from one or more blocks that spatially neighbor the first block (1602). Video decoder 300 may be further configured to determine a motion vector for a second block of video data using the history-based motion vector prediction table (1604), and encode the second block of video data using the determined motion vector (1606).

In some examples, video decoder 300 may include a display configured to display a picture containing the first block of video data and the second block of video data.

Figure 17:
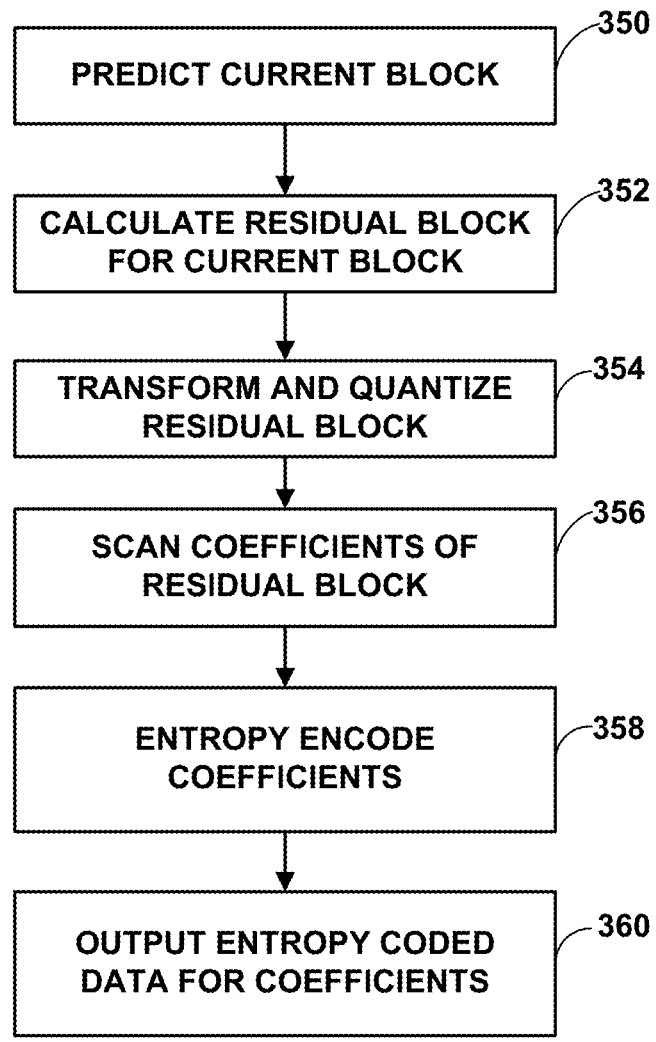
FIG. 17 is a flowchart illustrating another example encoding method.

FIG. 17 is a flowchart illustrating an example method for encoding a current block. The current block may comprise a current CU. Although described with respect to video encoder 200 (FIGS. 1 and 3), it should be understood that other devices may be configured to perform a method similar to that of FIG. 17.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 18:
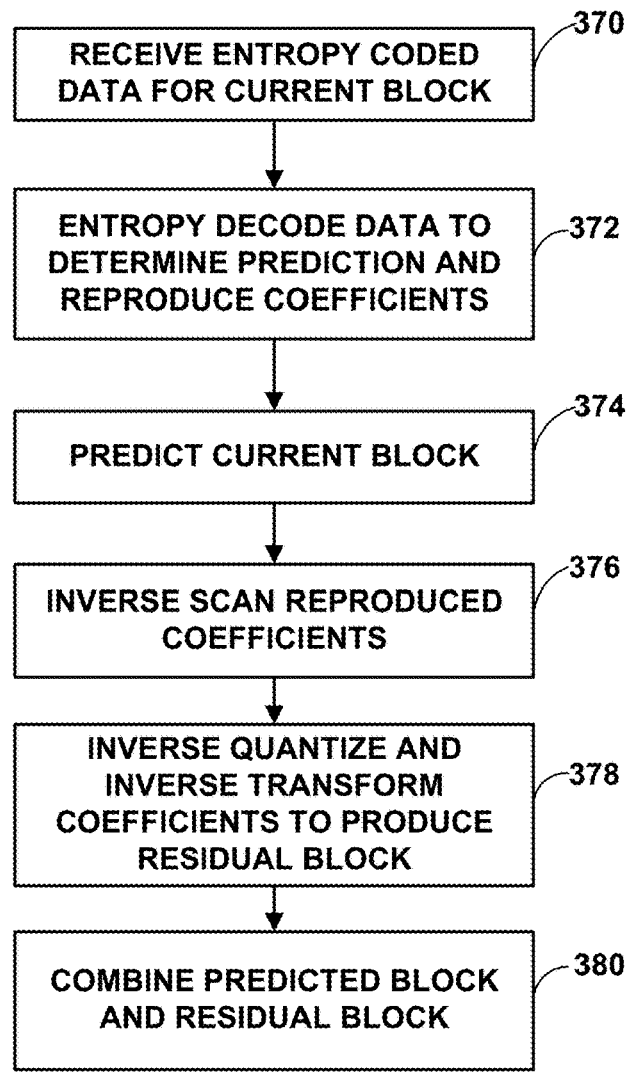
FIG. 18 is a flowchart illustrating another example decoding method.

FIG. 18 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 18.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
coding a first block of video data using affine motion compensation prediction, the first block being an affine coded block;
updating a history-based motion vector prediction table using a first motion vector from a block that spatially neighbors the affine coded block;
coding a second block of video data using non-affine inter prediction, the second block being a non-affine inter coded block and wherein the affine coded block and the non-affine inter coded block are different blocks;

updating the history-based motion vector prediction table using a second motion vector from a block that spatially neighbors the non-affine inter coded block;

determining, based on the history-based motion vector prediction table, a motion vector candidate for coding a third block of video data; and non-affine inter prediction coding the third block of video data using the motion vector candidate.

2. The method of claim 1, further comprising updating the history-based motion vector prediction table with at least one motion vector of a below-left spatially neighboring block of the affine coded block, a motion vector of a left spatially neighboring block of the affine coded block, a motion vector of an above-right spatially neighboring block of the affine coded block, a motion vector of an above spatially neighboring block of the affine coded block, or of an above-left spatially neighboring block of the affine coded block.

3. The method of claim 2, further comprising checking blocks that spatially neighbor the affine coded block in the following order: the below-left spatially neighboring block, the left spatially neighboring block, the above-right spatially neighboring block, the above spatially neighboring block, and the above-left spatially neighboring block.

4. The method of claim 1, further comprising updating the history-based motion vector prediction table with at least one motion vector of a center-left spatially neighboring block of the affine coded block and a motion vector of a center-top spatially neighboring block of the affine coded block.

5. The method of claim 1, further comprising updating the history-based motion vector prediction table with at least one motion vector of spatially neighboring blocks of the affine coded block that are between an above-right spatially neighboring block and an above-left spatially neighboring block.

6. The method of claim 1, further comprising updating the history-based motion vector prediction table with at least one motion vector of spatially neighboring blocks of the affine coded block that are between a below-left spatially neighboring block and an above-left spatially neighboring block.

7. The method of claim 1, further comprising updating the history-based motion vector prediction table with at least one motion vector from non-adjacent spatially neighboring blocks of the affine coded block.

8. The method of claim 1, further comprising
constructing a motion vector candidate list using the first motion vector from the block that spatially neighbors the affine coded block; and
non-affine inter prediction coding the third block of video data based on the first motion vector.

9. The method of claim 1, wherein coding comprising decoding, the method further comprising:
displaying a picture containing the affine coded block of video data, the non-affine coded block of video data, and the non-affine inter prediction coded third block of video data.

10. The method of claim 1, wherein coding comprising encoding, the method further comprising:
capturing a picture containing the image data associated with the affine coded block of video data the non-affine coded block of video data, and the non-affine inter prediction coded third block of video data.

11. An apparatus configured to code video data, the apparatus comprising:
a memory configured to store a first block of video data and a second block of video data; and
one or more processors implemented in circuitry and in communication with the memory, the one or more processors configured to:
code the first block of video data using affine motion compensation prediction, the first block being an affine coded block;
update a history-based motion vector prediction table using a first motion vector from a block that spatially neighbors the affine coded block;
code the second block of video data using non-affine inter prediction, the second block being a non-affine inter coded block and wherein the affine coded block and the non-affine inter coded block are different blocks;
update the history-based motion vector prediction table using a second motion vector from a block that spatially neighbors the non-affine inter coded block;
determine, based on the history-based motion vector prediction table, a motion vector candidate for coding a third block of video data; and
non-affine inter prediction code the third block of video data using the motion vector candidate.

12. The apparatus of claim 11, wherein the one or more processors are further configured to update the history-based motion vector prediction table with at least one motion vector of a below-left spatially neighboring block of the affine coded block, a motion vector of a left spatially neighboring block of the affine coded block, a motion vector of an above-right spatially neighboring block of the affine coded block, a motion vector of an above spatially neighboring block of the affine coded block, or a motion vector of an above-left spatially neighboring block of the affine coded block.

13. The apparatus of claim 12, wherein the one or more processors are further configured to check blocks that spatially neighbor the affine coded block in the following order: the below-left spatially neighboring block, the left spatially neighboring block, the above-right spatially neighboring block, the above spatially neighboring block, and the above-left spatially neighboring block.

14. The apparatus of claim 11, wherein the one or more processors are further configured to update the history-based motion vector prediction table with at least one motion vector of a center-left spatially neighboring block of the affine coded block and a motion vector of a center-top spatially neighboring block of the affine coded block.

15. The apparatus of claim 11, wherein the one or more processors are further configured to update the history-based motion vector prediction table with at least one motion vector of spatially neighboring blocks of the affine coded block that are between an above-right spatially neighboring block and an above-left spatially neighboring block.

16. The apparatus of claim 11, wherein the one or more processors are further configured to update the history-based motion vector prediction table with at least one motion vector of spatially neighboring blocks of the affine coded block that are between a below-left spatially neighboring block and an above-left spatially neighboring block.

17. The apparatus of claim 11, wherein the one or more processors are further configured to update the history-based motion vector prediction table with at least one motion vector from non-adjacent spatially neighboring blocks of the affine coded block.

18. The apparatus of claim 11, wherein the one or more processors are further configured to:
   construct a motion vector candidate list using the motion vector from the block that spatially neighbors the affine coded block; and
   non-affine inter prediction coding the third block of video data based on the first motion vector.

19. The apparatus of claim 11, wherein to code, the one or more processors are configured to decode, the apparatus further comprising:
   a display configured to display a picture containing the affine coded block of video data the non-affine coded block of video data, and the non-affine inter prediction coded third block of video data.

20. The apparatus of claim 11, wherein to code, the one or more processors are configured to encode, the apparatus further comprising:
   a camera configured to capture a picture containing the image data associated with the affine coded block of video data, the non-affine coded block of video data, and the non-affine inter prediction coded third block of video data.

21. An apparatus configured to code video data, the apparatus comprising:
   means for coding a first block of video data using affine motion compensation prediction, the first block being an affine coded block;
   means for updating a history-based motion vector prediction table using a first motion vector from a block that spatially neighbors the affine coded block;
   means for coding a second block of video data using non-affine inter prediction, the second block being a non-affine inter coded block and wherein the affine coded block and the non-affine inter coded block are different blocks;
   means for updating the history-based motion vector prediction table using a second motion vector from a block that spatially neighbors the non-affine inter coded block;
   means for determining, based on the history-based motion vector prediction table, a motion vector candidate for a third block of video data; and
   means for non-affine inter prediction coding the third block of video data using the motion vector candidate.

22. The apparatus of claim 21, further comprising means for updating the history-based motion vector prediction table with at least one motion vector of a below-left spatially neighboring block of the affine coded block, a motion vector of a left spatially neighboring block of the affine coded block, a motion vector of an above-right spatially neighboring block of the affine coded block, a motion vector of an above spatially neighboring block of the affine coded block, or a motion vector of an above-left spatially neighboring block of the affine coded block.

23. The apparatus of claim 22, further comprising means for checking blocks that spatially neighbor the affine coded block in the following order:
the below-left spatially neighboring block, the left spatially neighboring block, the above-right spatially neighboring block, the above spatially neighboring block, and the above-left spatially neighboring block.

24. The apparatus of claim 21, further comprising means for updating the history-based motion vector prediction table with at least one motion vector of a center-left spatially neighboring block of the affine coded block and a motion vector of a center-top spatially neighboring block of the affine coded block.

25. The apparatus of claim 21, further comprising
   means for constructing a motion vector candidate list using the first motion vector from the block that spatially neighbors the affine coded block; and
   means for non-affine inter prediction coding the third block of video data based on the first motion vector.

26. A non-transitory computer-readable storage medium storing instructions that, when executed, cause one or more processors to:
   code a first block of video data using affine motion compensation prediction, the first block being an affine coded block;
   update a history-based motion vector prediction table using a first motion vector from a block that spatially neighbor the affine coded block;
   code a second block of video data using non-affine inter prediction, the second block being a non-affine inter coded block and wherein the affine coded block and the non-affine inter coded block are different blocks;
   update the history-based motion vector prediction table using a second motion vector from a block that spatially neighbors the non-affine inter coded block;
   determine, based on the history-based motion vector prediction table, a motion vector candidate for coding a third block of video data; and
   non-affine inter prediction code the third block of video data using the motion vector candidate.

27. The non-transitory computer-readable storage medium of claim 26, wherein the instructions further cause the one or more processors to update the history-based motion vector prediction table with at least one motion vector of a below-left spatially neighboring block of the affine coded block, a motion vector of a left spatially neighboring block of the affine coded block, a motion vector of an above-right spatially neighboring block of the affine coded block, a motion vector of an above spatially neighboring block of the affine coded block, or a motion vector of an above-left spatially neighboring block of the affine coded block.

28. The non-transitory computer-readable storage medium of claim 27, wherein the instructions further cause the one or more processors to check blocks that spatially neighbor the affine coded block in the following order: the below-left spatially neighboring block, the left spatially neighboring block, the above-right spatially neighboring block, the above spatially neighboring block, and the above-left spatially neighboring block.

29. The non-transitory computer-readable storage medium of claim 26, wherein the instructions further cause the one or more processors to update the history-based motion vector prediction table with at least one motion vector of a center-left spatially neighboring block of the affine coded block and a motion vector of a center-top spatially neighboring block of the affine coded block.

30. The non-transitory computer-readable storage medium of claim 26, wherein the instructions further cause the one or more processors to:
   construct a motion vector candidate list using the first motion vector from the block that spatially neighbors the affine coded block; and
   non-affine inter prediction code the third block of video data based on the first motion vector.

* * * * *